United States Patent
Komori et al.

(10) Patent No.: US 7,832,941 B2
(45) Date of Patent: Nov. 16, 2010

(54) BEARING APPARATUS FOR A WHEEL OF VEHICLE

(75) Inventors: Kazuo Komori, Iwata (JP); Kazuhiro Baba, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/107,144

(22) Filed: Apr. 22, 2008

(65) Prior Publication Data
US 2008/0205811 A1 Aug. 28, 2008

Related U.S. Application Data

(63) Continuation of application No. PCT/JP2006/319854, filed on Oct. 4, 2006.

(30) Foreign Application Priority Data

Oct. 27, 2005 (JP) .............................. 2005-312621
Nov. 7, 2005 (JP) .............................. 2005-322324

(51) Int. Cl.
F16C 13/04 (2006.01)
F16C 19/04 (2006.01)

(52) U.S. Cl. ........................ 384/544; 384/490; 384/586; 384/589

(58) Field of Classification Search .............. 384/448, 384/450, 484, 489, 537, 543, 544, 589, 490, 384/588; 29/898.063, 898.066; 451/52
See application file for complete search history.

(56) References Cited

U.S. PATENT DOCUMENTS

| 4,454,640 | A | * | 6/1984 | Egusa et al. | ........... 29/898.063 |
|---|---|---|---|---|---|
| 4,506,422 | A | * | 3/1985 | Egusa | .................... 29/898.066 |
| 4,887,917 | A | * | 12/1989 | Troster et al. | ................ 384/543 |
| 5,195,807 | A | * | 3/1993 | Lederman | ................ 301/108.1 |
| 5,501,530 | A | | 3/1996 | Nagai et al. | |
| 5,911,458 | A | | 6/1999 | Bywalez et al. | |
| 5,974,665 | A | * | 11/1999 | Frielingsdorf et al. | .. 29/894.361 |
| 6,113,279 | A | * | 9/2000 | Sawai et al. | .................. 384/537 |
| 6,354,952 | B1 | * | 3/2002 | Boulton et al. | ............... 464/145 |
| 6,821,208 | B2 | * | 11/2004 | Krude et al. | ................. 384/544 |
| 7,104,695 | B2 | * | 9/2006 | Shevket | ....................... 384/450 |
| 7,232,374 | B2 | * | 6/2007 | Tajima et al. | ................ 384/544 |
| 7,350,976 | B2 | * | 4/2008 | Ohtsuki et al. | .............. 384/448 |
| 7,353,926 | B2 | * | 4/2008 | Ikeda et al. | .................. 192/45.1 |
| 2001/0007600 | A1 | | 7/2001 | Tajima et al. | |
| 2005/0111771 | A1 | | 5/2005 | Shevket | |
| 2005/0231025 | A1 | * | 10/2005 | Yasumura et al. | ......... 301/105.1 |
| 2005/0254741 | A1 | * | 11/2005 | Norimatsu | ................... 384/544 |
| 2006/0257063 | A1 | * | 11/2006 | Shigeoka | .................... 384/544 |

FOREIGN PATENT DOCUMENTS

| EP | 1 548 307 | 6/2005 |
|---|---|---|
| JP | 63-166601 | 7/1988 |
| JP | 63306878 A | * 12/1988 |

(Continued)

*Primary Examiner*—Marcus Charles
(74) *Attorney, Agent, or Firm*—Harness, Dickey & Pierce, P.L.C.

(57) ABSTRACT

A vehicle wheel bearing apparatus has a pitch circle diameter of an outer side ball group that is larger than a pitch circle diameter of an inner side ball group. Each corner portion of the outer circumferential surfaces of the inner member is rounded as a smooth circular arc.

8 Claims, 8 Drawing Sheets

FOREIGN PATENT DOCUMENTS

| | | |
|---|---|---|
| JP | 11-062985 | 3/1999 |
| JP | 2000-071705 | 3/2000 |
| JP | 2000-110839 | 4/2000 |
| JP | 2000-289403 | 10/2000 |
| JP | 2004-052784 | 2/2004 |
| JP | 2004-100754 | 4/2004 |
| JP | 2004-108449 | 4/2004 |
| JP | 2005-061616 | 3/2005 |
| JP | 2005-140181 | 6/2005 |
| WO | WO2004/022992 | 3/2004 |

\* cited by examiner

[Fig. 1]
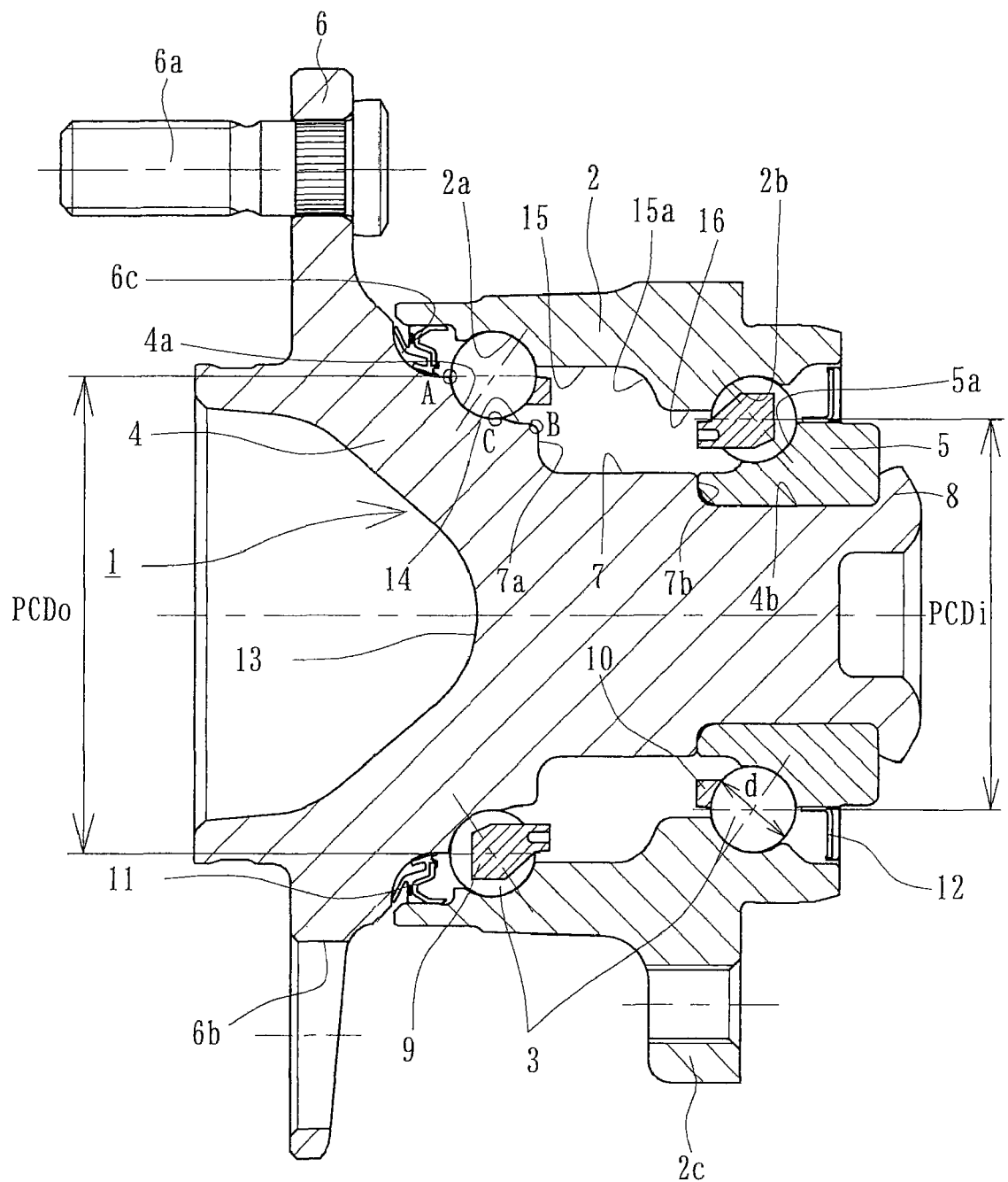

[Fig. 2]
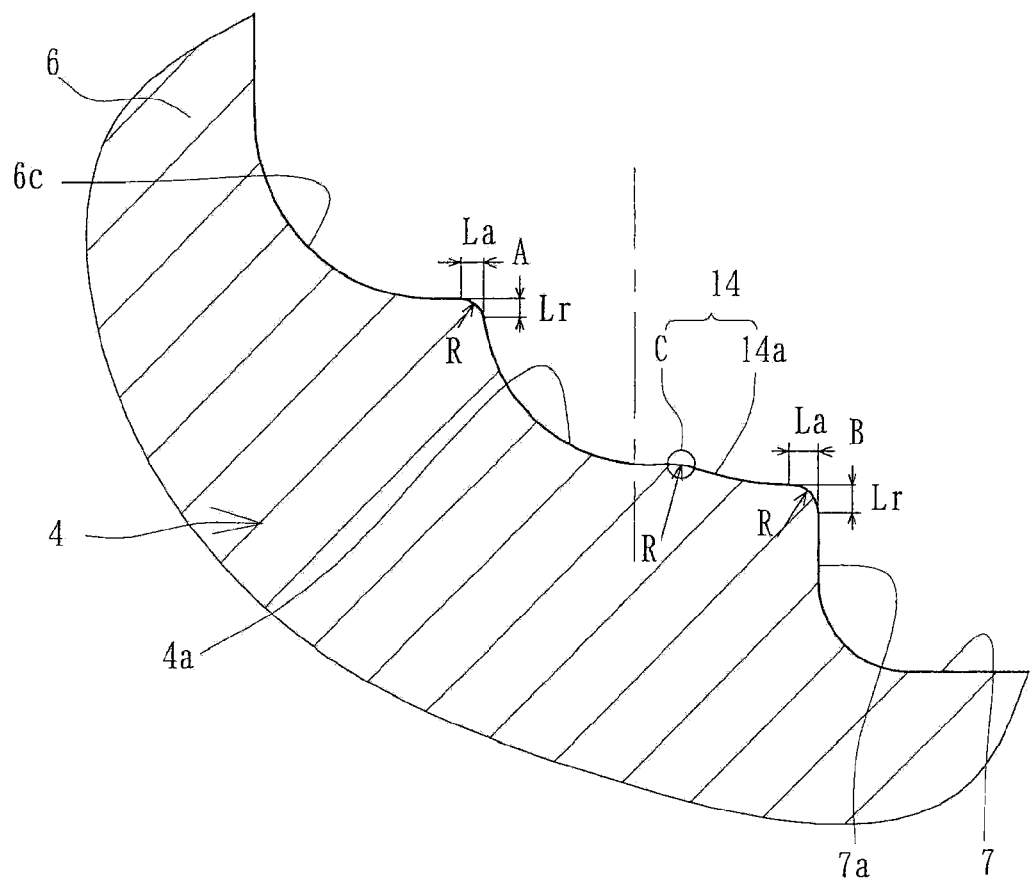
[Fig. 3]
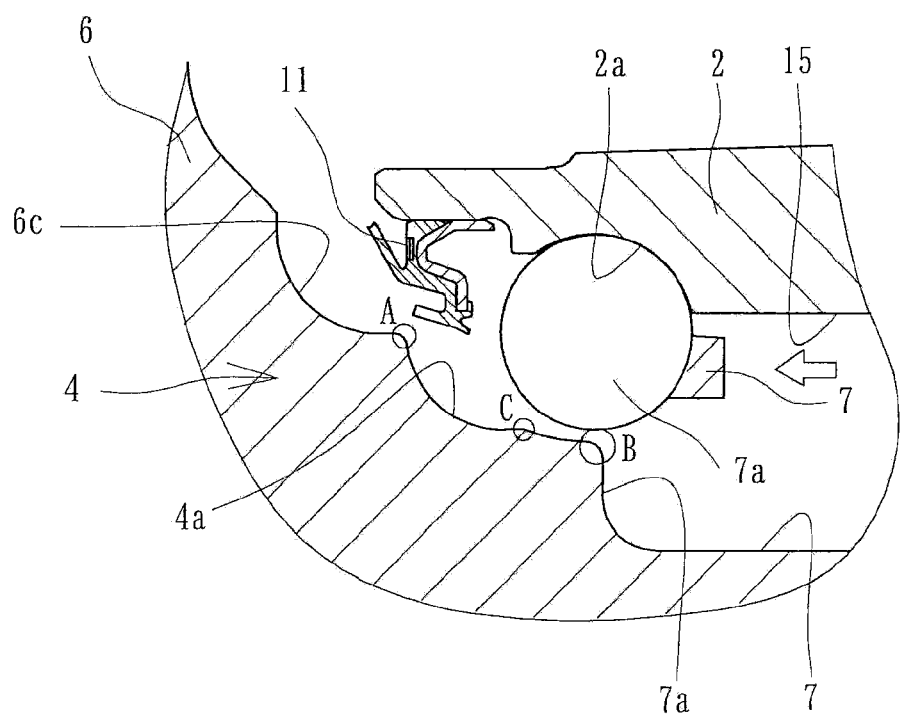

[Fig. 4]
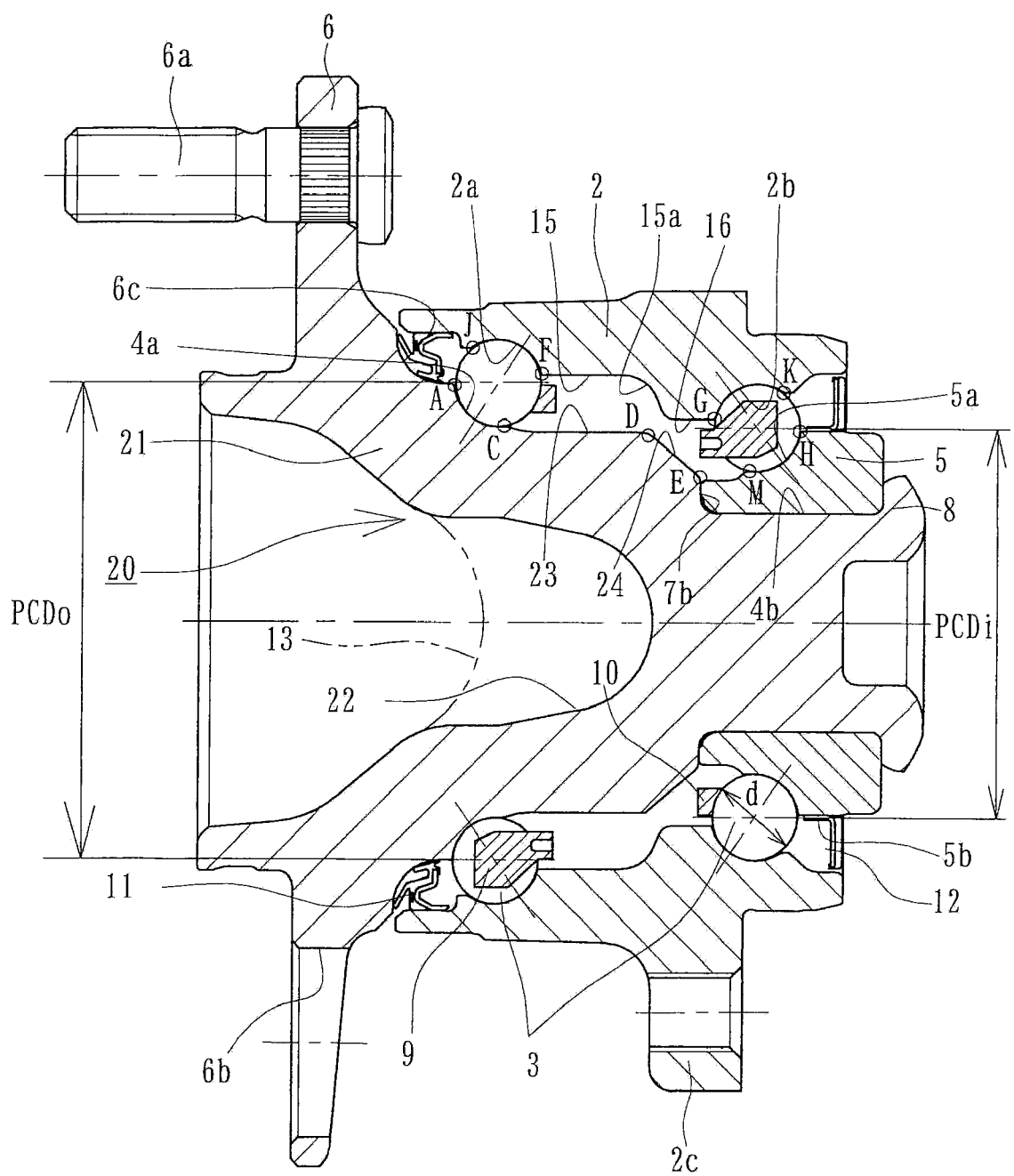

[Fig. 5]
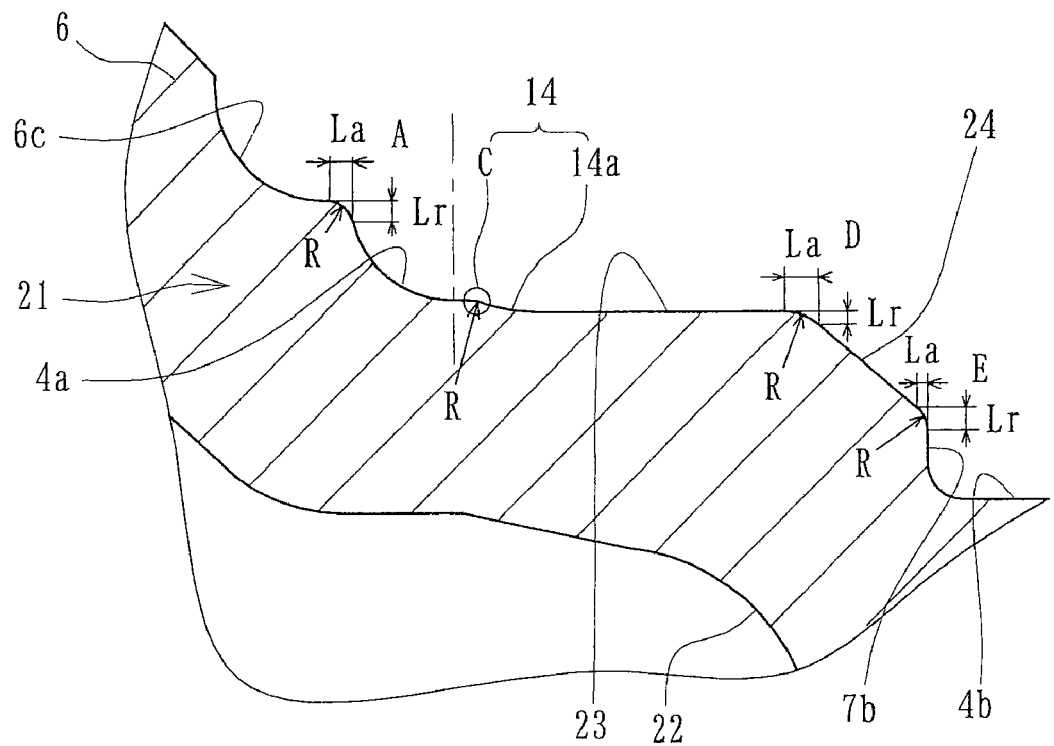
[Fig. 6]
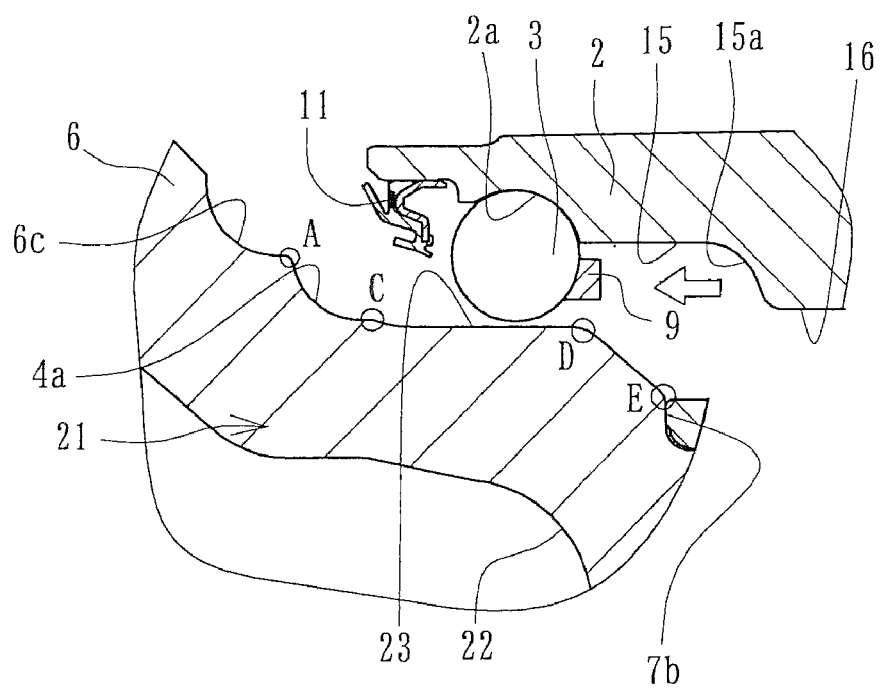

[Fig. 7]
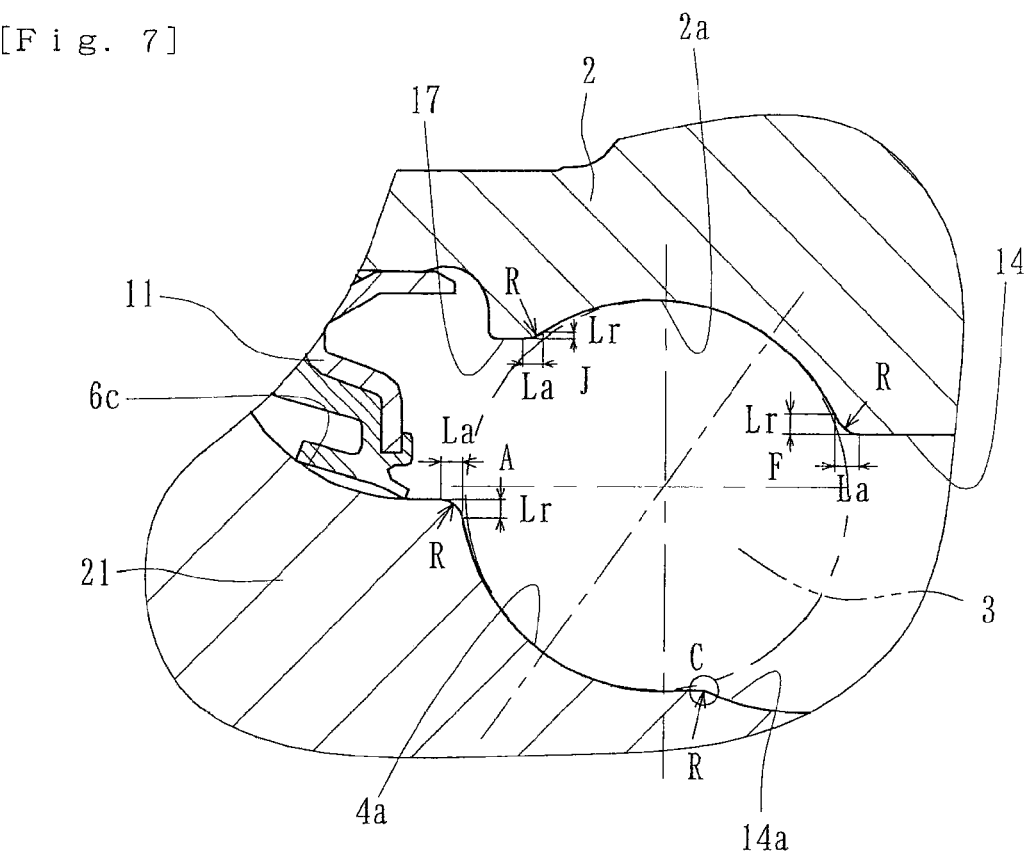
[Fig. 8]
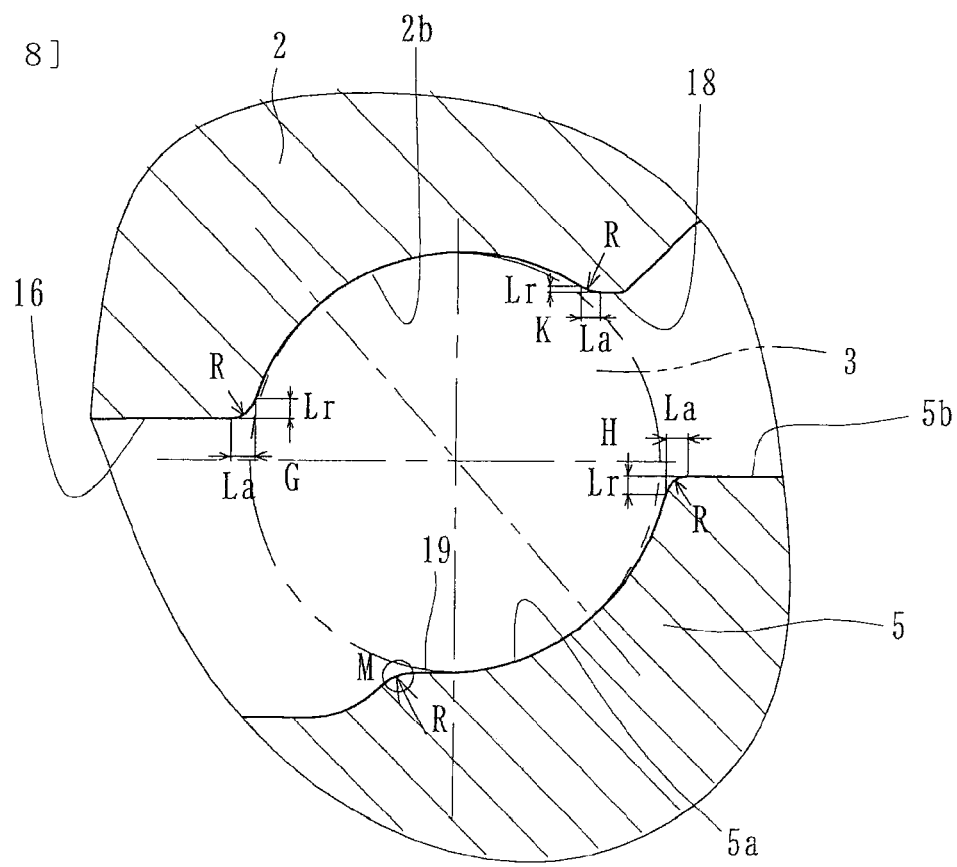

[Fig. 9]
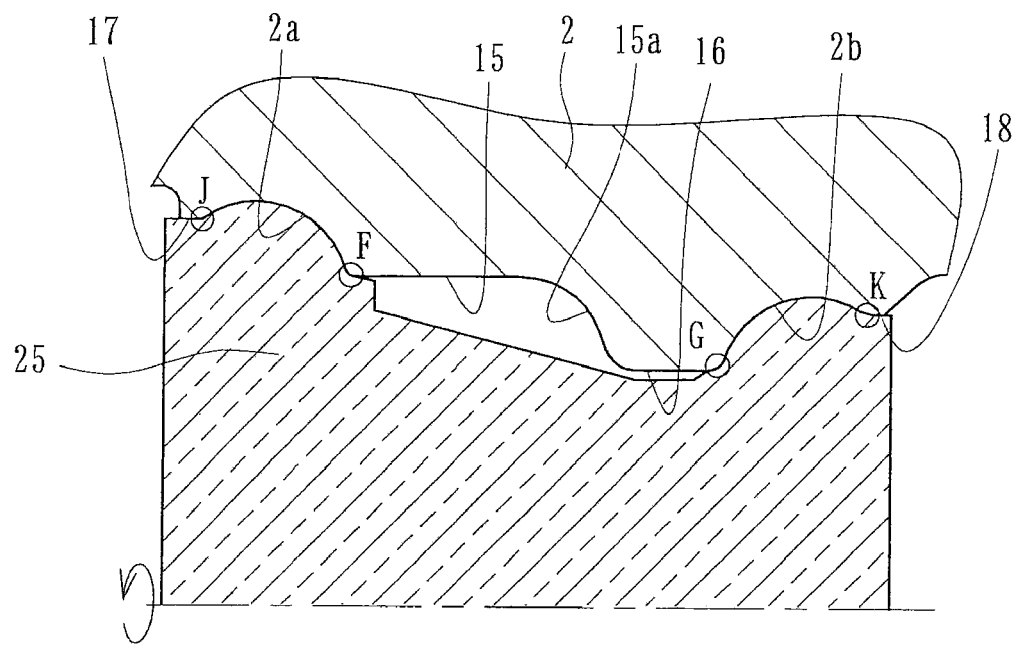
[Fig. 10]
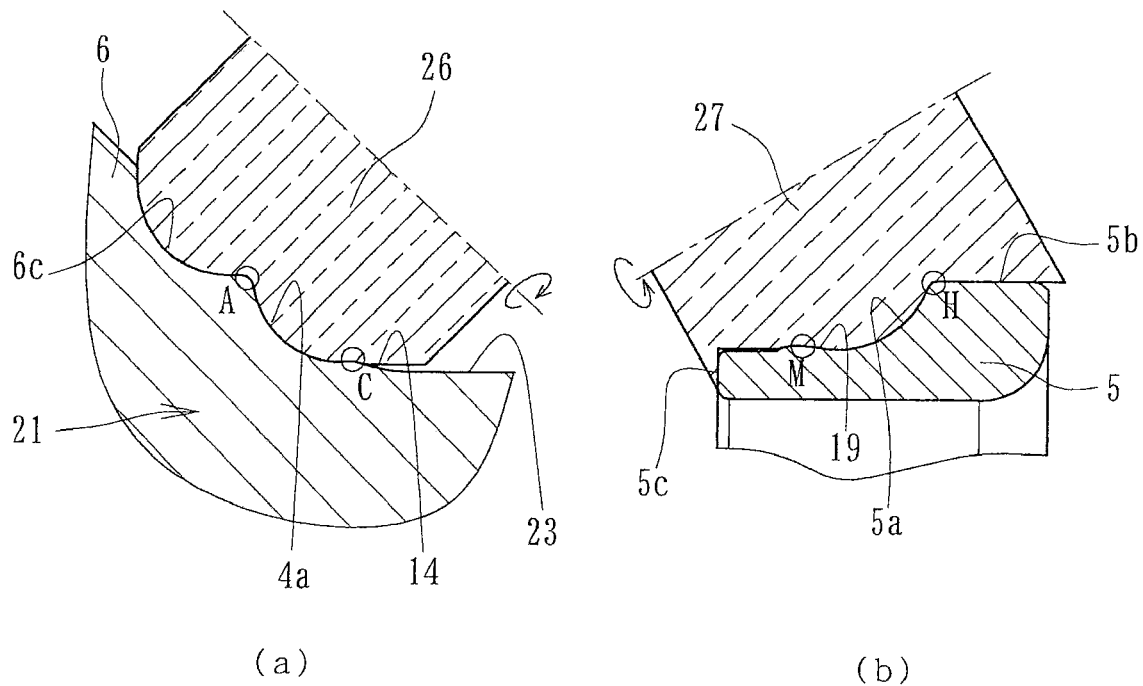
(a)            (b)

[Fig. 11]
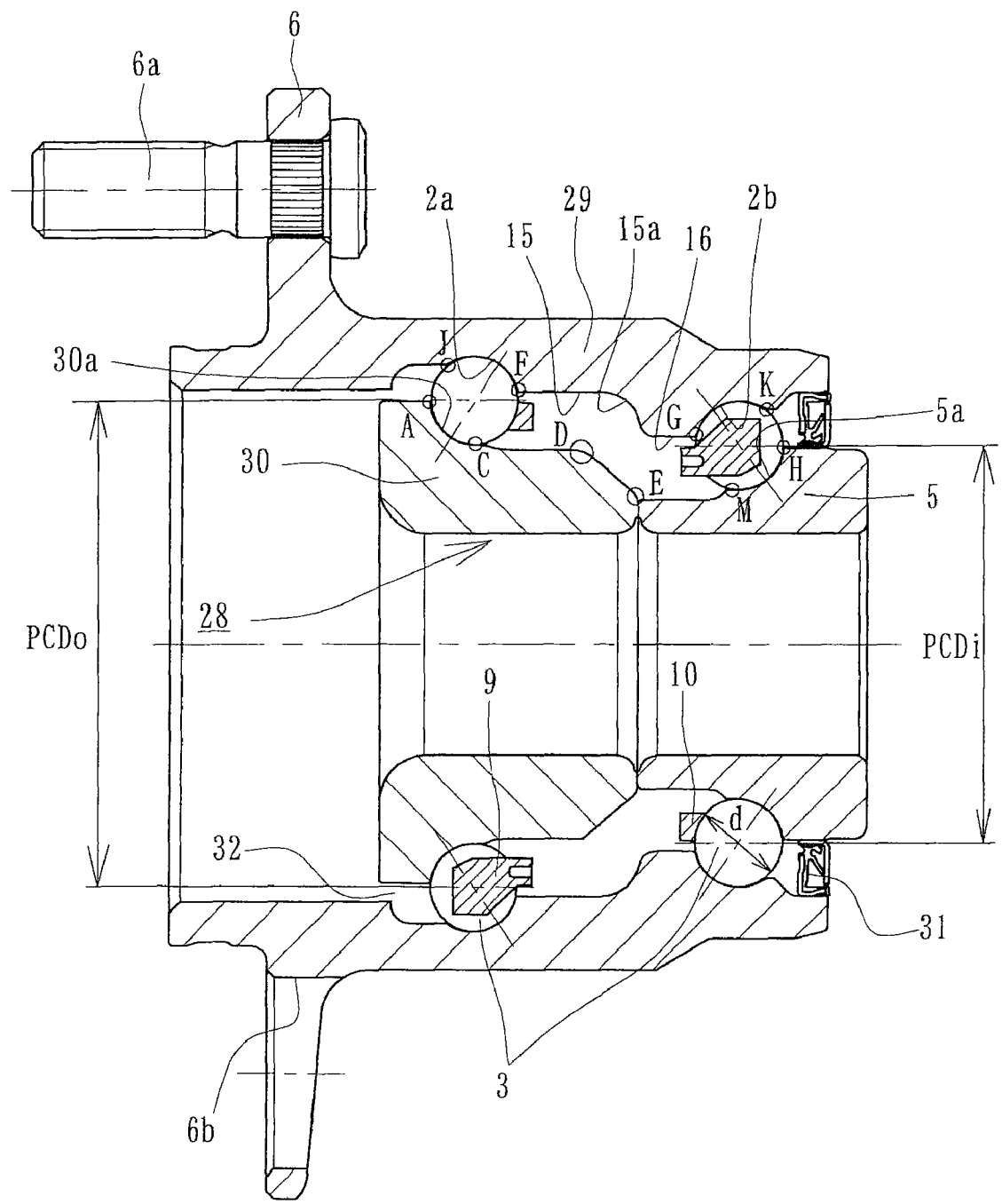

[Fig. 12]
PRIOR ART
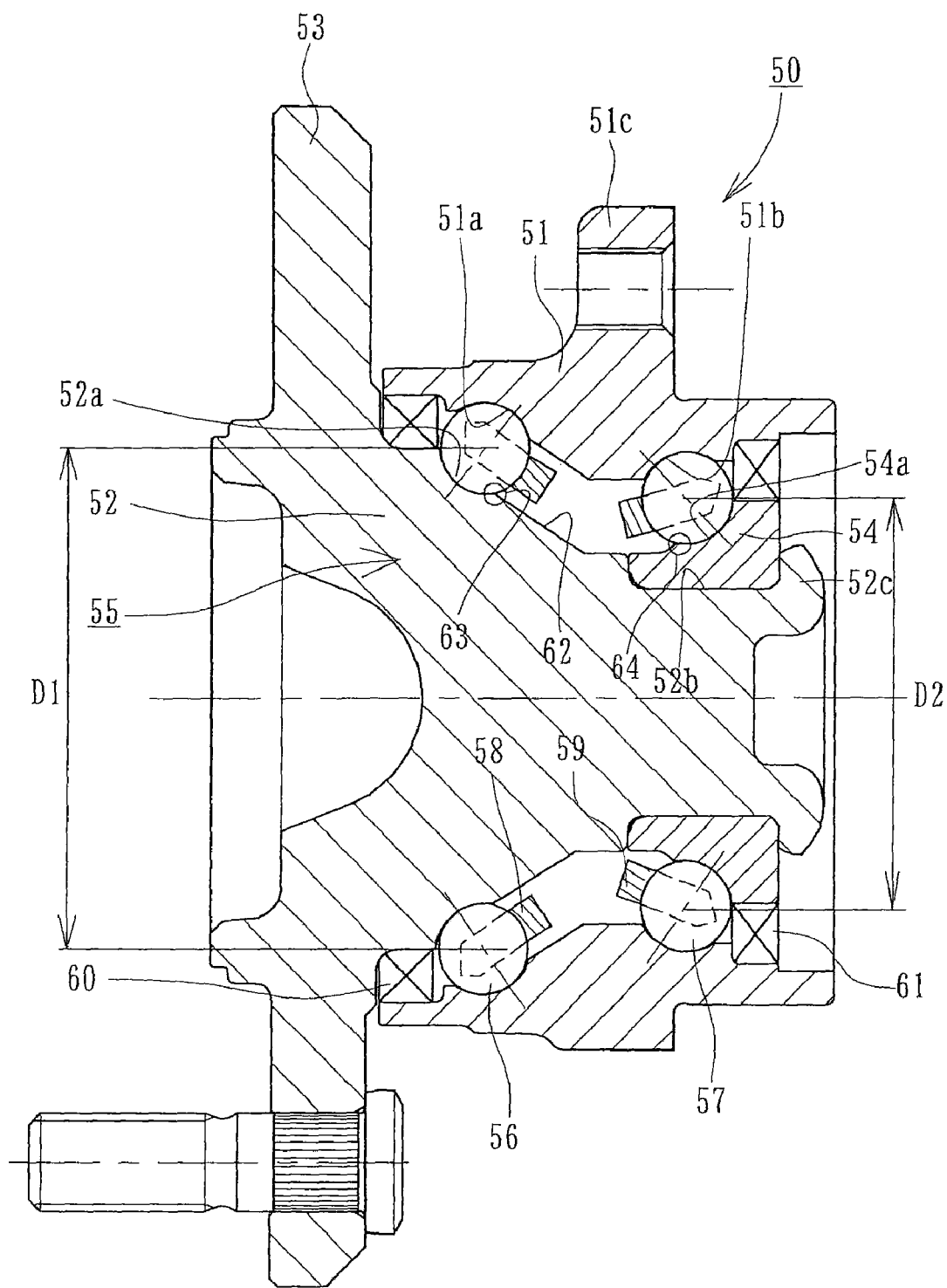

BEARING APPARATUS FOR A WHEEL OF VEHICLE

CROSS-REFERENCE TO RELATED APPLICATIONS

This application is a continuation of International Application No. PCT/JP2006/319854, filed Oct. 4, 2006, which claims priority to Japanese Application Nos. 2005-322324, filed Nov. 7, 2005 and 2005-312621, filed Oct. 27, 2005, The disclosures of the above applications are incorporated herein by reference.

FIELD

The present disclosure relates to a bearing apparatus to freely rotatably support a vehicle wheel, and more particularly, to a vehicle wheel bearing apparatus that improves the rigidity and life of the bearing apparatus.

BACKGROUND

Vehicle wheel apparatus is adapted to freely rotatably support a wheel hub to mount the wheel via a roller bearing. An inner ring rotation type is used for a driving wheel. Both inner ring rotation and outer ring rotation types are used for a driven wheel. A double row angular ball bearing is widely used in such a bearing apparatus since it has desirable bearing rigidity, high durability against misalignment and small rotation torque that is required for fuel consumption. The double row angular contact ball bearing has a plurality of balls interposed between a stationary ring and a rotational ring. The balls contact the stationary and rotational rings and are at a predetermined contact angle.

The vehicle wheel bearing apparatus is broadly classified into a first, second, third or fourth generation structure. In the first generation, a wheel bearing of double row angular contact ball bearing type is fit between a knuckle, forming part of a suspension, and a wheel hub. In the second generation type, a body mounting flange or a wheel mounting flange is directly formed onto the outer circumferential surface of an outer member. In the third generation type, one of the inner raceway surfaces is directly formed on the outer circumferential surface of the wheel hub. In the fourth generation type, the inner raceway surfaces are directly formed on the outer circumferential surfaces of the wheel hub and the constant velocity universal joint.

In prior art wheel bearing apparatus, both bearing row arrangements in the double row bearing are the same. Thus, the apparatus has sufficient rigidity during straight away running, however, optimum rigidity cannot always be obtained during curved running. That is, the positional relationship between wheels and the bearing apparatus is usually designed so that the weight of the vehicle acts substantially in the middle between the rows of bearing balls during the straight way running. However, larger radial loads and larger axial loads are applied to the axles of the vehicle on the side opposite to the curving direction (axles of the left hand side of the vehicle when right hand curving). Accordingly, it is effective to have a larger rigidity on the outer side of the bearing row than on the inner side of the bearing row inner side in order to improve the durability and strength of the bearing apparatus. Thus, a known vehicle wheel is shown in FIG. 12. It can have high rigidity without enlargement of the bearing apparatus.

The vehicle wheel bearing apparatus is formed with a double row angular ball bearing that includes an outer member 51 integrally formed with a body mounting flange on its outer circumferential surface. The flange is to be mounted on a knuckle (not shown) of a vehicle. The outer member 51 has double row outer raceway surfaces 51a, 51b. An inner member 55 includes a wheel hub 52 with a wheel mounting flange 53 integrally formed on one end to mount a wheel (not shown). One inner raceway surface 52a is formed on the outer circumferential surface opposite to one 51a of the double row outer raceway surfaces 51a,q 51b. A cylindrical portion 52b axially extends from the inner raceway surface 52a. An inner ring 54 is fit onto the cylindrical portion 52b and is formed on the other outer circumferential surface. The inner raceway surface 54a is opposite to the other raceway surface 51b of the double row outer raceway surfaces 51a, 51b. Double row balls 56, 57 are freely rollably contained between the outer raceway surfaces 51a, 51b and inner raceway surfaces 52a, 54a of the inner member 55. Cages 58, 59 rollably hold the balls 56, 57 in place.

The inner ring 54 is axially immovably secured on the cylindrical portion by a caulked portion 52c formed by radially outwardly plastically deforming the cylindrical portion 52b of the wheel hub 52. Seals 60, 61 are mounted in annular openings formed between the outer member 51 and the inner member 55. The seals 60, 61 prevent leakage of grease contained within the bearing apparatus. Additionally, they prevent the entry from the outside of rain water or dusts into the bearing apparatus.

A pitch circle diameter D1 of the outer side ball group 56 is set larger than a pitch circle diameter D2 of the inner side ball group 57. Accordingly, the diameter of the inner raceway surface 52a of the wheel hub 52 is larger than that of the inner raceway surface 54a of the inner ring 54. Also, the outer raceway surface 51a of the outer side of the outer member 51 is larger than the outer raceway surface 51b of the inner side of the outer member 51. The number of outer side balls 56 is larger than the number of inner side balls 57. By setting the pitch circle diameter D1 of the outer side larger than the pitch circle diameter D2 of the inner side (D1>D2), it is possible to obtain a large rigidity of the bearing apparatus 50 and thus to extend its life (see Japanese Laid-open Patent Publication No. 108449/2004).

In the prior art bearing apparatus 50, a stepped portion 62 is formed on the wheel hub 52 between the inner raceway surface 52a of the outer side and the cylindrical portion 52b on which the inner ring 54 is press fit. The presence of the stepped portion 62 (height of step: (D1−D2)/2) causes a problem where the balls 56 of the outer side, temporary assembled in the outer raceway surface 51a of the outer member 51 by the cage 58, tend to contact the stepped portion 62 and a counter portion 63 of the inner raceway surface 52a of the wheel hub 52. Thus, the balls may damage the stepped portion 62 and counter portions 65 during assembly of the bearing apparatus 50.

Additionally, micro damages may be caused on the surface of balls 56, 57 during press fitting of the inner ring 54 in a state where the inner side balls 57 are temporary assembled on the inner side outer raceway surface 51b of the outer member 51. That is, the balls 56, 57 may be damaged in this temporary assembling step not only by the contact of them against the counter portion 64 of the inner ring 54 but the contact of balls with each other. The damaged surfaces of the balls 56, 57 cause noise in the bearing apparatus and reduces the life of the bearing apparatus. Accordingly, very careful assembling work is required. This reduces assembling efficiency of the bearing apparatus.

SUMMARY

It is, therefore, an object of the present disclosure to provide a vehicle wheel bearing apparatus that can solve the antinomic problems of reducing the weight and size of the bearing apparatus and increasing the rigidity of the bearing apparatus. Also, it improves the noise characteristics and life of the bearing apparatus by preventing the generation of damage on the balls during their assembly.

In order to achieve the present disclosure, a vehicle wheel bearing apparatus comprises an outer member formed with double row outer raceway surfaces on its inner circumferential surface. Inner members are each formed with a double row inner raceway surface on its outer circumferential surface. The double row inner raceway surfaces are arranged opposite to the double row outer raceway surfaces. Double row ball groups are freely rollably contained between the outer raceway surfaces and inner raceway surfaces of the inner members and the outer member. A pitch circle diameter of an outer side ball group is larger than a pitch circle diameter of an inner side ball group. Each corner portion of the outer circumferential surfaces of the inner member is rounded as a smooth circular arc.

Accordingly, the pitch circle diameter of the outer side ball group is larger than the pitch circle diameter of the inner side ball group. Each corner portion of the outer circumferential surfaces of the inner member is rounded as a smooth circular arc. Thus, it is possible to provide a vehicle wheel bearing apparatus that can suppress the generation of ball damage during assembly of the bearing apparatus. This improves the noise characteristics, life as well as the rigidity of the bearing apparatus.

Each of corner portions of the counter portions of the outer and inner raceway surfaces is rounded as a smooth circular arc. This makes it possible to suppress the generation of damage on the balls during both the assembly of the bearing apparatus by a bearing manufacturer as well as assembly by an automobile manufacturer. Thus, this improves the noise characteristics and the reliability of the bearing apparatus.

Each of corner portions of the shoulders of the outer and inner raceway surfaces is rounded as a smooth circular arc. This makes it possible to suppress the generation of "edge load" even though the oval contacting region rides over shoulders of the raceway surfaces. Thus, this extends the life of the bearing apparatus.

The outer diameter of each ball is same. The number of balls in the outer side ball group is larger than the number of balls of the inner side ball group. This makes it possible to improve both the rigidity and the life of the bearing apparatus.

The corner portions, respectively of the shoulders and the counter portions, are simultaneously ground by a formed grinding wheel with the inner and outer raceway surface after heat treatment. This makes it possible to form smoother shoulders and corner portions.

The inner member comprises a wheel hub with a wheel mounting integrally formed at one end. One inner raceway surface is formed on the outer circumferential surface opposite to one of the double row outer raceway surfaces. A cylindrical portion axially extends from the inner raceway surface. An inner ring is fit onto the cylindrical portion. The inner ring is formed with the other inner raceway surface on its outer circumferential surface. The other inner raceway surface is opposite to the other raceway surface of the double row outer raceway surfaces. A substantially conical recess is formed at an outer side end portion of the wheel hub. The depth of the recess extends to at least near the bottom of the inner raceway surface of the wheel hub so that the outer side end portion of the wheel hub has a substantially constant wall thickness. This makes it possible to simultaneously solve the antinomic problems of reducing the weight and size of the bearing apparatus and increasing the rigidity of the bearing apparatus.

A shaft shaped portion is formed so that it extends from the bottom of the inner raceway surface of the wheel hub toward the cylindrical portion. A tapered stepped portion is formed between the shaft shaped portion and a shoulder, which abuts the inner ring. The depth of the recess extends to near the stepped portion beyond the bottom of the inner raceway surface. This makes it possible to further reduce the weight of the bearing apparatus.

A ratio (d/PCDi) of the outer diameter (d) of each ball to a pitch circle diameter (PCDi) of the inner side ball group is set in a range $0.14 \leqq (d/PCDi) \leqq 0.25$. This makes it possible to satisfy both the high rigidity and long life of the bearing apparatus.

The vehicle wheel bearing apparatus has an outer member formed with double row outer raceway surfaces on its inner circumferential surface. Inner members are each formed with an inner raceway surface on its outer circumferential surface. The double row inner raceway surfaces are arranged opposite to the double row outer raceway surfaces. Double row ball groups are freely rollably contained between the outer raceway surfaces and inner raceway surfaces of the inner members and the outer member. A pitch circle diameter of an outer side ball group is larger than a pitch circle diameter of an inner side ball group. Each corner portions of the outer circumferential surfaces of the inner member is rounded as a smooth circular arc. These features make it possible to provide a vehicle wheel bearing apparatus that can suppress the generation of ball damage during assembly of the bearing apparatus. Additionally, they improve the noise characteristics life as well as the rigidity of the bearing apparatus.

A vehicle wheel bearing apparatus comprises an outer member formed with double row outer raceway surfaces on its inner circumferential surface. An inner member includes a wheel hub with a wheel mounting flange integrally formed at one end. One inner raceway surface is formed on the outer circumferential surface of the inner member opposite to one of the double row outer raceway surfaces. A cylindrical portion axially extends from the inner raceway surface. An inner ring is fit onto the cylindrical portion. The inner ring is formed with the other inner raceway surface on its outer circumferential surface. The other inner raceway surface is opposite to the other outer raceway surface of the double row outer raceway surfaces. Double row ball groups are freely rollably contained between the outer raceway surfaces and inner raceway surfaces of the inner members and the outer member. A pitch circle diameter of the outer side ball group is larger than a pitch circle diameter of an inner side ball group. Each corner portions of the outer circumferential surfaces of the inner member is rounded as a smooth circular arc.

DRAWINGS

Additional advantages and features of the present disclosure will become apparent from the subsequent description and the appended claims, taken in conjunction with the accompanying drawings, wherein:

FIG. 1 is a longitudinal section view of a first embodiment of a vehicle wheel bearing apparatus.

FIG. 2 is an enlarged sectional view of the wheel hub of FIG. 1.

FIG. 3 is an enlarged sectional view of a condition during assembly of the inner side ball group onto the inner raceway surfaces of the wheel hub.

FIG. 4 is a longitudinal section view of a second embodiment of the vehicle wheel bearing apparatus.

FIG. 5 is an enlarged sectional view of the wheel hub of FIG. 4.

FIG. 6 is an enlarged sectional view of a condition during assembly of the inner side ball group onto the inner raceway surfaces of the wheel hub.

FIG. 7 is an enlarged sectional view of the bearing row of outer side of FIG. 4.

FIG. 8 is an enlarged sectional view of the bearing row of inner side of FIG. 4.

FIG. 9 is an explanatory view of a grinding wheel applied to the outer member after heat treatment.

FIG. 10(a) is an explanatory view of a grinding wheel applied to the wheel hub after heat treatment thereof.

FIG. 10(b) is an explanatory view of a grinding wheel applied to the inner ring after heat treatment.

FIG. 11 is a longitudinal section view of a third embodiment of the vehicle wheel bearing apparatus.

FIG. 12 is a longitudinal section view of a prior art vehicle wheel bearing apparatus.

DETAILED DESCRIPTION

Embodiments of the present disclosure will be hereinafter described with reference to the drawings.

FIG. 1 is a longitudinal section view of a first embodiment of the vehicle wheel bearing apparatus. FIG. 2 is an enlarged sectional view of the wheel hub of FIG. 1. FIG. 3 is an enlarged sectional view of a condition during assembly of the inner side ball group onto the inner raceway surfaces of the wheel hub. In the description below, the term "outer side" (left hand side in the drawings) of the apparatus denotes a side which is positioned outside of the vehicle body. The term "inner side" (right hand side in the drawings) of the apparatus denotes a side that is positioned inside of the body when the bearing apparatus is mounted on the vehicle body.

The vehicle wheel bearing apparatus of the present disclosure shown in FIG. 1 is a third generation type used with a driven wheel. It includes an inner member 1, an outer member 2, and double rows of balls (ball groups) 3, 3 rollably contained between the inner and outer members 1, 2. The inner member includes wheel hub 4 and an inner ring 5 press fit onto the wheel hub with a predetermined interference.

The wheel hub 4 is integrally formed with a wheel mounting flange 6 at one end. One (outer side) inner raceway surface 4a is on the outer circumferential surface of the wheel hub. A cylindrical portion 4b extends from the inner raceway surface 4a through a shaft shaped portion 7. Hub bolts 6a are arranged on the wheel mounting flange 6 equidistantly along the periphery of the wheel mounting flange 6. Circular apertures 6b are formed between the hub bolts 6a. These circular apertures 6b contribute not only to weight reduction of the bearing apparatus but to passage of any fastening tool that may be used to assemble and disassemble of the bearing apparatus.

The inner ring 5 is formed on its outer circumferential surface with the other (inner side) inner raceway surface 5a. The inner ring is adapted to be press fit onto the cylindrical portion 4b of the wheel hub 4 with a predetermined interference. The inner ring 5 is axially secured by a caulked portion 8 formed by plastically deforming the end of the cylindrical portion 4b.

The wheel hub 4 is made of medium carbon steel including carbon of about 0.40~0.80% by weight, such as S53C, and is hardened by high frequency induction quenching. This forms a region including the inner raceway surface 4a from the inner side base 6c of the wheel mounting flange 6 to the cylindrical portion 4b with a surface hardness of about 58~64 HRC. The caulked portion 8 surface hardness remains as is after forging. Accordingly, the wheel mounting flange 6 has a sufficient mechanical strength against applied rotary bending load. The anti-fretting strength of the cylindrical portion 4b at a region press fit by the inner ring 5 can be improved. The plastically deforming working of the caulked portion 8 can be carried out without any micro crack during the caulking process. The inner ring 5 and the balls 3 are made of high carbon chrome bearing steel, such as SUJ 2, and hardened to their core by dip quenching to have a hardness of about 58~64 HRC.

The outer member 2 is integrally formed on its outer circumferential surface with a body mounting flange 2c that is to be mounted onto a knuckle (not shown) of a vehicle. The inner circumferential surface of the outer member has an outer side outer raceway surface 2a opposite to the inner raceway surface 4a of the wheel hub 4. Also, it includes an inner side outer raceway surface 2b opposite to the inner raceway surface 5a of the inner ring 5. Double rows of balls 3, 3 are contained between these outer and inner raceway surfaces and rollably held by cages 9, 10. The outer member 2 is made of medium carbon steel including carbon of about 0.40~0.80% by weight, such as S53C. The double row outer raceway surfaces 2a, 2b are hardened by high frequency induction quenching to have a surface hardness of about 58~64 HRC. A seal 11 is mounted within an outer side end portion of an annular space formed between the outer member 2 and the inner member 1. A magnetic encoder 12 is mounted within an inner side end of the annular space to detect the rotational speed of wheel. The seal 11 and a cap (not shown) cover the opened end of the outer member 2 to prevent the leakage of grease contained within the bearing. Also, they prohibit the entry, from the outside, of rain water and dusts into the bearing. Although the structure shown here is that of a third generation bearing, the bearing apparatus of the present disclosure can be applied to the structures of bearing of the first, second and fourth generation.

As shown in FIG. 1, a pitch circle diameter PCDo of the outer side ball group 3 is set larger than a pitch circle diameter PGDi of the inner side ball group 3 (PCDo>PCDi). The diameter "d" of each ball 3 is the same in both the outer side and inner side. The number of balls of the outer side ball group 3 is larger than the number of balls of the inner side ball group 3 due to the fact that PCDo>PCDi.

A substantially conical recess 13 is formed at an outer side end portion of the wheel hub 4 in order to reduce the weight of the bearing apparatus. The depth of the recess 13 extends to near the bottom of the inner raceway surface 4a of the wheel hub 4. Thus, the outer side end portion of the wheel hub 4 has a substantially constant wall thickness. As clearly shown in FIG. 1, the outline configuration of the wheel hub 4 is gradually reduced from the inner raceway surface 4a to the cylindrical portion 4b, via the counter portion 14, a stepped portion 7a, the shaft shaped portion has a smaller diameter, and a shoulder portion 7b to which the inner ring 5 is abutted. Due to the fact PCDo>PCDi, the diameter of the inner raceway surface 4a of the wheel hub 4 is larger than that of the inner raceway surface 5a of the inner ring 5. The outer diameter of the shaft shaped portion 7 is set so that it has substantially the same diameter as the bottom diameter of the inner raceway surface 5a of the inner ring 5.

On the other hand, in the outer member 2, due to the fact PCDo>PCDi, the diameter of the outer side outer raceway surface 2a is larger than the inner side outer raceway surface 2b. The outer side outer raceway surface 2a continues to the inner side outer raceway surface 2b via a cylindrical shoulder 15, a stepped portion 15a and a shoulder 16 of a smaller diameter. The inner diameter of the bottom of the outer raceway surface 2b is set so that it has substantially the same diameter as the inner diameter of the shoulder 15 of a larger diameter.

In the vehicle wheel bearing apparatus having such a structure, since the pitch circle diameter PCDo of the outer side ball group 3 is larger than the pitch circle diameter PCDi of the inner side ball group 3 and the number of balls of the outer side ball group 3 is larger than the number of balls of the inner side ball group 3, the rigidity of the bearing apparatus at the outer side can be increased. Thus, the life of the bearing apparatus can be extended. In addition, a recess 13 is formed at the outer side end portion of the wheel hub 4. Thus, the wall thickness of the wheel hub 4 at the outer side end portion is substantially constant. This solves the antinomic problems of reducing the weight and size of the bearing apparatus while increasing the rigidity of the bearing apparatus.

In addition to the increase of the bearing rigidity at the outer side, a ratio of the diameter "d" of each ball 3 to the pitch circle diameter PCDi of the inner side ball group 3 (d/PCDi) is set in a predetermined range of $0.14 \leq (d/PCDi) \leq 0.25$.

In view of the bearing rigidity, a smaller diameter "d" of each ball 3 is preferable since a larger number of balls 3, a smaller diameter "d", can increase the bearing rigidity in the same pitch circle diameter PCDi. However in view of the life of the bearing apparatus, a larger diameter "d" of the ball 3 is preferable since the larger diameter "d" of the ball 3 reduces the rolling fatigue strength. As a result of a FEM analysis (analysis using an electrolytic electron microscope) of the relationship between the pitch circle diameter PCDi and the diameter "d" of ball 3, it has been found that the bearing rigidity cannot be increased when d/PCDi exceeds 0.25. On the contrary, the rolling fatigue strength is lowered when d/PCDi is less than 0.14. Accordingly, it is possible to satisfy both the increase of the rigidity and extension of the bearing life by setting the ratio d/PCDi in the range of $0.14 \leq (d/PCDi) \leq 0.25$ in addition to setting the pitch circle diameter PCDo of the outer side ball group 3 larger than the pitch circle diameter PCDi of the inner side ball group 3.

In this embodiment, each corner portion on the outer circumferential surface of the wheel hub 4 is rounded to have a smooth circular arc. That is, as shown in the enlarged view of FIG. 2, a corner (transition) A between the base portion (shoulder) 6c and the inner raceway surface 4a, and a corner B of the stepped portion 7a are formed to have a predetermined chamfered configuration having a corner radius R. More particularly the corner A is formed so that it has an axial chamfer dimension La of 0.15~0.8 mm, preferably about 0.15~0.3 mm. The radial chamfer dimension Lr is about 0.15~0.8 mm, preferably about 0.15~0.3 mm. The corner radius R is about 0.15~2.0 mm, preferably about 45~0.7 mm in order to have smooth transition portions. When the corner radius R is less than 0.15 mm, the balls 3 tend to be scratched. When the corner radius R exceeds 2.0 mm, the oval contact region of the ball 3, oval region formed by a contact area between the ball 3 and the inner raceway surface 4a, tends to ride over the inner raceway surface 4a and come out from the inner raceway surface 4a. Similarly the corner B is formed so that it has the axial chamfer dimension La and the radial chamfer dimension Lr of about 0.5~5 mm. The corner radius R is about 1.0~10 mm. Thus, it has a smooth transition portion.

In addition, a counter portion 14 is formed near the bottom of the inner raceway surface 4a. The counter portion 14 has a predetermined width and a diameter larger than the bottom of the inner raceway surface 4a. The counter portion 14 includes a corner portion C near the bottom of the inner raceway surface 4a. A smaller diameter portion 14a is formed either by a tapered surface reducing its diameter from the corner C toward the inner side or by a circular arc surface with a predetermined radius of curvature. The stepped portion 7a is formed adjacent to the smaller diameter portion 14a, via a corner B. The corner C of the counter portion 14 is also formed as a smooth circular arc having a corner radius R of 1.0~5 mm.

The corner portions A, B. C on the outer circumferential surface of the wheel hub 4 are rounded. Thus, it is possible to suppress the generation of damage on the balls 3 during the assembling step of the bearing apparatus as shown in FIG. 3 even though the outer side balls 3 contact the corners A, B, C of the wheel hub 4. Thus, this improves the noise characteristics and the life of the bearing apparatus.

In addition, it is possible to prevent the lip of the seal 11 from contacting the corner A. This improves the reliability of the sealing quality. It is also possible to suppress the generation of "edge load" even though the oval contacting region rides over the corner A when a large bending moment is applied to the wheel bearing apparatus. The term "edge load" means a large concentrated stress generated in the corners that often causes premature delamination of the parts.

The corners A, C are ground by the formed grinding wheel simultaneously with the inner raceway surface 4a after heat treatment. The corner B of the stepped portion 7a is formed as a rounded circular arc by a bite. This prevents the generation of burrs and thus forms the outer diameter of the counter portion 14 with high accuracy. According to this embodiment not only are the inner raceway surface 4a of the wheel hub 4 but the shoulder 5b of the inner raceway surface 5a of the inner ring 5, shoulders 15, 16 of the outer raceway surfaces 2a, 2b of the outer member 2 and its counter portion are rounded and formed as smooth circular arcs. This prevents the generation of ball damage during assembly of the bearing apparatus. Additionally, it prevents the generation of "edge load" even though the oval contacting region rides over the corners.

FIG. 4 is a longitudinal section view of a second embodiment of the vehicle wheel bearing apparatus. FIG. 5 is an enlarged sectional view of the wheel hub of FIG. 4. FIG. 6 is an enlarged sectional view of a condition during assembly of the inner side ball group onto the inner raceway surfaces of the wheel hub. FIG. 7 is an enlarged sectional view of the bearing row of the outer side of FIG. 4. FIG. 8 is an enlarged sectional view of the bearing row of inner side of FIG. 4. FIG. 9 is an explanatory view of a grinding wheel applied to the outer member after heat treatment. FIG. 10(a) is an explanatory view of a grinding wheel applied to the wheel hub after heat treatment. FIG. 10(b) is an explanatory view of a grinding wheel applied to the inner ring after heat treatment. Since the second embodiment is different from the first embodiment only in the structure of the wheel hub, the same reference numerals are used to designate same parts as those with the same functions used in the first embodiment.

This bearing apparatus is a third generation type used for a driven wheel. It has an inner member 20, an outer member 2, and double row ball groups 3, 3 freely rollably contained between the outer and inner members 20, 2. The inner member 20 has a wheel hub 21. The inner ring 5 is press fit onto the wheel hub 21, via a predetermined interference.

The wheel hub 21 is made of medium carbon steel including carbon of about 0.40~0.80% by weight, such as S53C. The wheel hub 21 is formed with a recess 22. The recess 22 is provided at the outer side end portion of the wheel hub 21 and is deeper than the recess 13 of the first embodiment, shown in phantom line. The depth of recess 22 extends to a position near a stepped portion 24, beyond the bottom of the inner raceway surface 4a, so that the wall thickness of the outer side end portion of the wheel hub 21 becomes substantially constant. Due to the fact that PCDo>PCDi, the diameter of the inner raceway surface 4a of the wheel hub 21 is larger than the inner raceway surface 5a of the inner ring 5. The outer diameter of the shaft shaped portion 23 is set so that it has a larger diameter than the bottom diameter of the inner raceway surface 5a of the inner ring 5.

Similar to the first embodiment, the bearing apparatus of the second embodiment has a larger bearing rigidity at the outer side than at the inner side. In addition, since the depth of the recess 22 in the second embodiment is larger than the recess 13 in the first embodiment, the reduction of weight of the bearing apparatus can be further promoted.

Also in this embodiment each of the corner portions on the outer circumferential surface of the wheel hub 21 is rounded to have a smooth circular arc. That is, as shown in the enlarged view of FIG. 5, a corner (transition) A between the base portion 6c and the outer side inner raceway surface 4a, a corner D between the tapered stepped portion 24 and the shaft shaped portion 23, and a corner E between the stepped portion 24 and the shoulder 7b are formed with a predetermined chamfered configuration having a corner radius R. More particularly, each of the corners D, E is formed so that it has an axial chamfer dimension La of about 0.5~5 mm and a radial chamfer dimension Lr of about 0.5~5 mm. The corner radius R of is about 1.0~10 mm to have smooth transition portions.

The corner portions A, C, D, E on the outer circumferential surface of the wheel hub 21 are rounded. Thus, it is possible to suppress the generation of damage on the balls 3 during the assembling step of the bearing apparatus even though the outer side balls 3 contact the corners A, C, D, E of the wheel hub 21. Thus, this improves the noise characteristics and the life of the bearing apparatus.

Also in this embodiment, each corner A between the raceway surface 4a and the base portion 6c, corners F, G at the shoulders 15, 16 of the outer member 2, and corner H on the outer circumferential surface 5b of the inner ring 5 is rounded to have a smooth circular arc. Each counter portions 17, 18 of the outer member 2, corners J, K on the outer raceway surfaces 2a, 2b, and corner M of counter portion 19 is also rounded to have a smooth circular arc. The counter portions 17, 18, 14, 19 axially correspond to the shoulder portions 15, 16, 6c, 5b, respectively, of each raceway surface. More particularly as shown in enlarged views of FIGS. 7 and 8, the axial chamfer dimension La is about 0.15~0.8 mm, preferably 0.15~0.3 mm. The radial chamfer dimension Lr is about 0.15~0.8 mm, preferably 0.15~0.3 mm. The corner radius R is 0.15~2.0 mm, preferably 0.45~0.7 mm in order to have smooth transition portions.

As shown in FIGS. 9 and 10, the corner portions A, F, G, H of the shoulders and the corner portions C, J, K, M of the counter portions are ground by formed grinding wheels 25, 26, 27 simultaneously with the raceway surfaces, after heat treatment. That is, as shown in FIG. 9, the double row outer raceway surfaces 2a, 2b of the outer member 2 are ground together by the formed grinding wheel 25. The corners F, G of the shoulders 15, 16 and the corner portions J, K of the counter portions 17, 18 are also simultaneously ground by the formed grinding wheel 25. As shown in FIG. 10(a), the base portion 6c that forms the seal-land portion of the wheel mounting flange 6 and the inner raceway surface 4a are ground by the formed grinding wheel 26. Additionally, the corner A, of the shoulder 6c, and the corner C, of the counter portion 14, are also simultaneously ground by this formed grinding wheel 26. The inner raceway surface 5a, the outer circumferential surface 5b, on which the encoder 12 is press fit, and the end face 5c of the smaller diameter side of the inner ring are simultaneously ground by the formed grinding wheel 27. The corner H on the outer circumferential surface 5b and the corner M of the counter portion 19 are simultaneously ground by the same formed grinding wheel 27 as shown in FIG. 10(b).

As described above, the corners A, F, G, H of shoulders and the corners C, J, K, M of the counter portions are ground together by the formed grinding wheel 25, 26, 27 simultaneously with the outer and inner raceway surfaces 4a, 2a, 2b, 5a. Each corner is rounded to have a smooth circular arc. Thus, it is possible to suppress the generation of "edge load" even though the oval contacting region, formed by contact between each of the raceway surfaces 4a, 2a, 2b, 5a and the ball 3, rides over each corner. Accordingly, it is possible to provide a bearing apparatus that can prevent the generation of damage on the balls and thus improve its life, noise characteristics and reliability in addition to its high rigidity.

Although it is described that the outer diameter "d" of each ball 3 is the same, balls having different diameters may be used in each row of balls. For example the diameter of each ball arranged at the outer side may be smaller than each ball arranged at the inner side to increase the number of ball in the outer side row.

FIG. 11 is a longitudinal section view showing a third embodiment of the vehicle wheel bearing apparatus, The same reference numerals are used to designate the same parts as those having the same functions used in the previous embodiments.

This bearing apparatus is a second generation type used for driven wheels. It has an inner member 28, an outer member 29, and double row balls 3, 3 freely rollably contained between the outer and inner members 28, 29. The inner member 28 has a pair of inner rings 30, 5. The inner rings 30, 5 are formed with inner raceway surfaces 30a, 5a on their outer circumferential surfaces.

The outer member 29 is made of medium carbon steel including carbon of about 0.40~0.80% by weight such as S53C. A wheel mounting flange 6 is integrally formed on its outer circumferential surface. Double row outer raceway surfaces 2a, 2b are formed on the inner circumferential surface of the outer member 29. The double row ball groups 3, 3 are rollably contained between the outer and inner raceway surfaces by cages 9, 10. They form a back-to-back double row angular contact ball bearing. A seal 31 is mounted on the inner side end portion of the outer member 29. A labyrinth seal 32 is formed between the outer side end and the inner ring 30. These seals 32 and a cap (not shown) cover the opened end of the outer member 29 to prevent the leakage of grease contained in the bearing and entry from the outside of rain water and dusts into the bearing.

Similarly to the previous embodiments, a pitch circle diameter PCDo of the outer side ball group 3 is set larger than a pitch circle diameter PCDi of the inner side ball group 3. The diameter "d" of each ball 3 is the same in both the outer side and inner side. Thus, the number of balls of the outer side ball group 3 is larger than the number of balls of the inner side ball group 3. This is due to the fact that PCDo>PCDi. Due to the fact PCDo>PCDi, the diameter of the outer raceway surface 30a of the outer side inner ring 30 is larger than the inner raceway surface 5a of the inner side inner ring 5.

Also similar to the previous embodiment, a pitch circle diameter of the outer side ball group is set larger than the inner side ball group. Thus, it is possible to extend the life of the bearing. In addition, the corners A, F, G, H of the shoulders and the corners C, J, K, M of the counter portions are rounded and form smooth circular arcs. Thus, it is possible to suppress the damage to the balls 3 caused by contact or vibration during assembly of the bearing apparatus.

The vehicle wheel bearing apparatus of the present disclosure can be applied to any of the bearing apparatus of the first~fourth generations irrespective of the driving wheel or the driven wheel.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A vehicle wheel bearing apparatus comprises:
   an outer member formed with double row outer raceway surfaces on its inner circumferential surface;
   inner member formed with an inner raceway surface on its outer circumferential surface, said inner raceway surface arranged opposite to the double row outer raceway surfaces;
   a rounded counter portion surface is formed on each raceway, each raceway surface and counter portion surfaces are ground simultaneously, at least one inner raceway surface counter portion formed near the bottom of the inner raceway surface has a desired width and including a smaller diameter portion adjacent a tapered stepped portion;
   double row ball groups are freely rollably contained between the outer raceway surfaces and inner raceway surface of the inner member and the outer member;
   a pitch circle diameter of an outer side ball group is larger than a pitch circle diameter of an inner side ball group; and
   each corner portions of the outer circumferential surfaces of the inner members is rounded as a smooth circular arc.

2. The vehicle wheel bearing apparatus of claim 1, wherein each corner portions of counter portions of the outer and inner raceway surfaces is rounded as a smooth circular arc.

3. The vehicle wheel bearing apparatus of claim 1, wherein each corner portions of shoulders of the outer and inner raceway surfaces is rounded as a smooth circular arc.

4. The vehicle wheel bearing apparatus of claim 1, wherein the outer diameter of each ball is the same, and the number of balls of the outer side ball group larger than the number of balls of the inner side ball group.

5. The vehicle wheel bearing apparatus of claim 3, wherein the corner portions respectively of the shoulders and the counter portions are simultaneously ground by a formed grinding wheel with the inner and outer raceway surface, after heat treatment.

6. The vehicle wheel bearing apparatus of claim 1, wherein said inner member comprises a wheel hub with an integrally formed wheel mounting at one end, one inner raceway surface is formed on the outer circumferential surface of the wheel hub opposite to one of the double row outer raceway surfaces, a cylindrical portion axially extends from the inner raceway surface, an inner ring is fit onto the cylindrical portion and is formed with an inner raceway surface on its outer circumferential surface, the inner raceway surface is opposite to the other raceway surface of the double row outer raceway surfaces, and a substantially conical recess is formed at an outer side end portion of the wheel hub, depth of the recess extends to at least near the bottom of the inner raceway surface of the wheel hub so that the outer side end portion of the wheel hub has a substantially constant wall thickness.

7. The vehicle wheel bearing apparatus of claim 6, wherein a shaft shaped portion is formed to extend from the bottom of the inner raceway surface of the wheel hub toward the cylindrical portion, a tapered stepped portion is formed between the shaft shaped portion and a shoulder which abuts the inner ring, and the depth of the recess extends to near the stepped portion beyond the bottom of the inner raceway surface.

8. The vehicle wheel bearing apparatus of claim 1, wherein a ratio (d/PCDi) of the outer diameter of each ball to a pitch circle diameter of the inner side ball group is set in a range of about $0.14 \leqq (d/PCDi) \leqq 0.25$.

* * * * *

UNITED STATES PATENT AND TRADEMARK OFFICE
CERTIFICATE OF CORRECTION

| | | |
|---|---|---|
| PATENT NO. | : 7,832,941 B2 | Page 1 of 1 |
| APPLICATION NO. | : 12/107144 | |
| DATED | : November 16, 2010 | |
| INVENTOR(S) | : Kazuo Komori et al. | |

It is certified that error appears in the above-identified patent and that said Letters Patent is hereby corrected as shown below:

<u>Column 1</u>
Line 10 "2005," should be --2005.--

<u>Column 6</u>
Line 46 "PGDi" should be --PCDI--

Signed and Sealed this
Fifth Day of April, 2011

David J. Kappos
*Director of the United States Patent and Trademark Office*